United States Patent Office 2,853,971
Patented Sept. 30, 1958

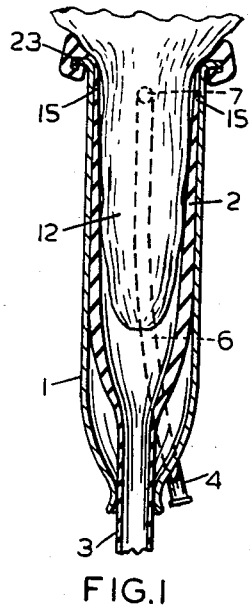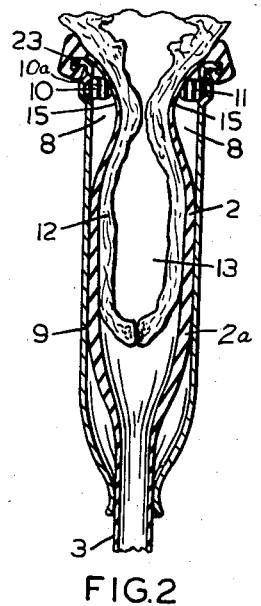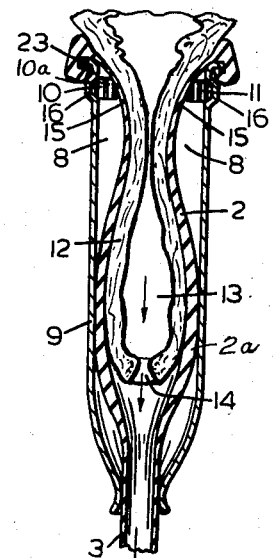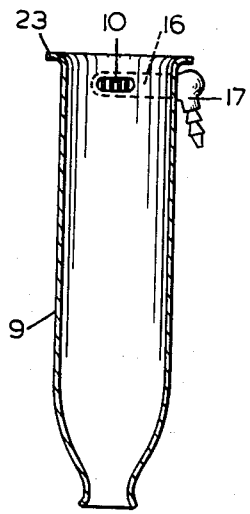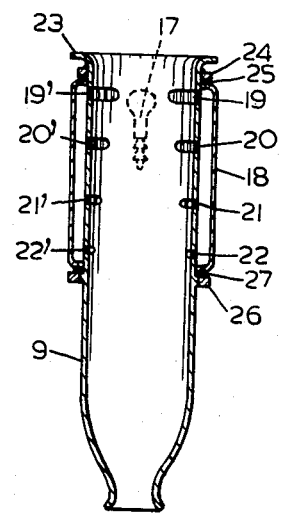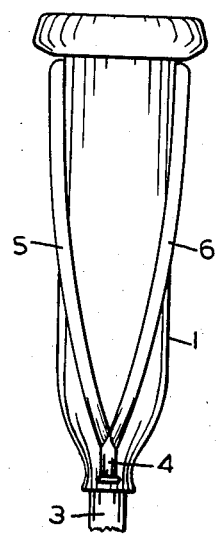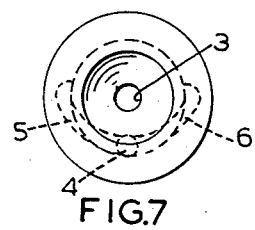

2,853,971

TEAT CUP UNITS FOR USE WITH MECHANICAL MILKING MACHINES

Anne Bajema, Ferwoude, Netherlands, assignor to "N. V. Ahex," Amsterdam, Netherlands, a company of the Netherlands Application December 30, 1954, Serial No. 478,821

Claims priority, application Netherlands July 22, 1949

4 Claims. (Cl. 119—14.52)

This is a continuation-in-part of my co-pending application, Serial Number 175,205, filed July 21, 1950, now Patent No. 2,712,298, dated July 5, 1955.

The present invention relates to mechanical milking and is more particularly concerned with teat cup units for use with mechanical milking machines.

In general, pneumatic milking devices are provided with teat-holders which are positioned on each teat of the cow, each holder clamping the teat by means of a rubber nipple carried in the teat-cup portion of the teat-holder. The lower end of the rubber nipple is connected to a flexible tube passing to the outside through the lower end of the teat-cup. The flexible tube is hermetically connected to a milk receptacle in which a vacuum is maintained by any convenient vacuum-producing means. Thus, the milk receptacle is conveniently connected to a vacuum-conduit wherein the vacuum is maintained by means of a vacuum pump via a vacuum-tank. The above-mentioned rubber nipple will be referred to hereinafter as the "teat-cup lining."

The vacuum-conduit from the vacuum-producing pump is also connected to a pulsator which, by means of a second flexible tube, is connected to the space between the flexible teat-cup lining and the teat-cup, the pulsator alternately providing a vacuum in this space and admitting atmospheric air to the space. The closing muscle of the teat is opened by this pulsating action again and again, the milk being sucked from the milk space in the udder through the teat and the opening in the closing muscle and by way of the flexible tube at the end of the teat-cup lining, into the milk receptacle.

As disclosed in my said Patent No. 2,712,298, I have found that the vacuum at the teats is advantageously increased from the usual 35 to 40 cm. of mercury vacuum to a vacuum of more than 60 cm. mercury pressure and that many advantages are obtained by this higher vacuum such as a more complete milking in a shorter time, no milk remaining in the udder to be milked out by hand, an increase in the fat content, avoidance of the formation of callosity in the teats, and restorement of previously damaged teats to their original healthy condition.

In order to obtain the greatest benefit of these advantages, the construction of the teat-holders needs to be taken into consideration.

It is an object of the present invention to provide an improved teat-holder construction particularly suited for use with vacua above 45 cm. and up to 60 cm. of mercury or more. The improved teat-holders are, however, also suitable for use with lower vacua.

In teat-holder constructions now in use, the pulsator is connected with the space between the teat-cup lining and teat-cup wall only by way of a single opening. In accordance with the present invention, however, the space between the teat-cup wall and the teat-cup lining is connected to the pulsator by way of at least two openings, diametrically opposite each other, and preferably immediately under the upper rim of the teat-cup.

When there is only one opening in the teat-cup, the teat-cup lining will be moved from the center during each pulsation, owing to the unsymmetrically operating forces, so that the closing muscle of the teat will not be opened in the right manner. The teat-cup lining will touch the wall of the cup again and again, causing irritation of the outer side of the teat and thereby the dreaded formation of callosity, a tissue formation adversely affecting milk production by preventing the supple action of the closing muscle.

This vibration of the teat-cup lining is stronger when there is a greater difference between the pressures causing the pulsation.

With a teat-holder having two opposite inlet-openings for air, in accordance with the present invention, the forces acting on the teat-cup lining are divided in such manner that the teat-cup lining remains substantially in the center of the teat-cup at all times so that the above-mentioned disadvantages are avoided.

Moreover, by reason of the fact that the air inlets are in the upper part of the teat-cup wall, the pressure on the teat-cup lining is exerted in a downwardly-increasing manner so that the milk is pressed outwardly from the teat in the manner effected by hand milking and "milking" by a calf.

It is, therefore, a further object of the present invention to provide a construction in which atmospheric air intermittently admitted by the pulsator between the teat-cup lining and the teat-cup wall arrives at both opposite inlet openings at the same time and with the same pressure.

It is another object of the invention to provide a conduit which is connected to the two opposite inlet openings in such manner that the teat-cup with its associated parts occupies minimum space.

It is a still further object of the invention to provide a teat-cup construction which operates in a manner closely simulating the action of skilled hand milking wherein the fingers of the hand pressing the teats substantially from two opposite sides are closed around the teat one after another in a downward direction.

Still other objects of the invention are to provide a teat-holder construction which prevents the occurence of so-called "blue teats" or blue spots on the teats resulting from interference with the blood circulation in the teats. When suffering from "blue teats," the cow withholds milk, it is impossible to obtain a good milk yield, and permanent damage to the teats may also result.

It is a further object of the invention to provide a teat-cup construction which prevents the closing muscle of the teat from being kept closed too long during the period in which the milk is driven downwardly.

These and other objects and the means by which they are obtained according to the invention will be apparent from the following detailed description of illustrative embodiments shown by way of example in the accompanying drawings wherein:

Fig. 1 is a longitudinal sectional view through a teat-holder embodying features of the present invention, showing it in position on a teat;

Fig. 2 is a longitudinal sectional view of a teat-holder having a modified form of teat-cup as seen along a vertical plane perpendicular to the plane of section of Fig. 1 and showing the teat-cup lining construction in a first phase of compression of the teat;

Fig. 3 is a sectional view similar to Fig. 2 but showing the relative position of parts in a second phase of compression;

Fig. 4 is a longitudinal sectional view through the teat-cup of the teat-holder of Figs. 2 and 3 taken along a vertical plane perpendicular to the plane of section of Figs. 2 and 3;

Fig. 5 is a longitudinal sectional view of another teat-cup embodiment;

Fig. 6 is a side elevational view of the teat-cup of the teat-holder of Fig. 1; and Fig. 7 is a top plan view on the teat-cup of Fig. 6.

As shown in Fig. 1, the teat-holder in the embodiment illustrated consists of a metal teat-cup 1 with a rubber teat-cup lining 2 disposed inside the cup and having an elongated tubular portion 3 extending from the cup 1 and adapted to be connected to a milk receptacle. Directly under the rim 23, there are two diametrically-opposite openings 7 formed in the teat-cup wall and communicating with these openings are air conduits 5 and 6 which merge into a common mouthpiece 4.

As shown in Figs. 6 and 7, the two air conduits 5 and 6 are led along the wall of the teat-cup 1 and are united with the mouthpiece 4 near the lower, tapering part of the cup wall, the mouthpiece 4 having an internal diameter which is about twice the inner diameter of the tubes 5 and 6. Figure 7 shows that the air conduits 5 and 6 and mouthpiece 4 do not make the teat-holder bulky as the mouthpiece falls under the larger upper part of the teat-holder. The teat-holders illustrated are adapted to be used with a conventional vacuum milk receptacle which is introduced in the vacuum line between the source of the vacuum and the teat-cup, communication with the teat-cup being provided through tubes 3 and 4.

The air conduits 5 and 6 are, of course, in air-tight communication with the openings 7 and these openings lead to the space 8 between the rubber teat-lining 2 and the wall of the cup 1. By means of the pulsator of the milk receptacle this space is alternately connected to the vacuum source and to the atmosphere, e. g. 40 times a minute. At each pulsation the teat-lining presses from two opposite sides on the teat and during this action the closing muscle of the teat is opened, so that the milk is sucked from the teat by means of the vacuum in the tube 3, as will be described more in detail hereinafter.

With the above-described construction it is possible to reduce the time for milking a cow to about 2 minutes and to obtain the advantages mentioned above of larger milk production, higher fat content of the milk, and a better condition of the teats of the cow.

In the teat-cup embodiment of Figs. 2 to 4, wherein the teat-cup is designated by the reference numeral 9, the openings 7 of Fig. 1 are replaced by diametrically-opposite openings 10 and 11 which are somewhat oblong in form and are subdivided into a circumferential row of small openings by means of longitudinal partitions 10a. As shown in the drawings, the teat-cup 9 is formed with an entrance chamber 16 adjacent the openings 10 and 11, the entrance chamber 16 extending outwardly from the main body of the wall of teat-cup 9.

In Fig. 4 it is seen that chamber 16 extends around the teat-cup 9 for more than one-half of its circumference and is connectible to the pulsator by means of a nipple 17 which is disposed halfway between the two openings 10 and 11, so that the air will reach both openings at the same time. The nipple 17 is connected to the pulsator by any convenient flexible air conduit (not shown). Thus, the teat-cup lining is acted upon at two points opposite each other and by equal forces, as in the construction of Fig. 1, so that the teat-cup lining remains in the center of the teat-cup.

Fig. 2 shows a teat-holder during the first phase of the pulsator-stroke, when atmospheric air is supplied in the space 8 between the walls of the teat-cup and the teat-cup lining 2, through the two openings 10 and 11. The teat 12 and a part of the udder are shown in cross-section, the space interiorly of the teat being designated 13. The upper part of the teat 12 is compressed from two opposite sides by the teat-cup lining 2. This pressure is first applied at the upper end of the teat and thus the teat is gradually compressed in a downward direction, as is clear from Fig. 3 which shows the next phase of compression. By reason of the arrangement of the openings 10 and 11 (or the openings 7) opposite each other, the pressure is symmetrically applied at both sides of the teat, so that the advantages described above will be realized. The milk in the space 13 of the teat is pressed downwardly, the closing muscle at the end of the teat is opened and the milk flows out through the teat-opening 14 and through the tube 3 to the milk receptacle. For maintaining good blood-circulation in the teats and to prevent "blue teats" it is of importance that the area of pressure on the teat be extended gradually from the upper part to the lower part thereof and that the opening 14 of the teat is not closed too long by the pressure of atmospheric air on the outside of the teat-cup lining 2. In order to permit this action, the elastic teat-cup lining 2, as shown in Figs. 1 to 3, has a thin walled portion 15 at its upper end opposite the openings 10 and 11 but the thickness of the wall gradually increases in the direction of the lower half of the teat-cup lining and then decreases as the bottom portion of the lining merges into the wall of the elastic tubular portion 3. The thicker parts of the lining require more time to be pressed inwardly and thus the arrangement of the entrance-openings 10 and 11 (or the openings 7) at the upper end of the teat-holder cooperates with the lining structure to obtain a compression of the teat which develops regularly and gradually from the upper part thereof to its lower end.

The middle portion 2a of the teat-lining 2 is made substantially thicker to bring the thickness of the wall to at least twice the thickness of the upper portion. In teat-cup 9, the construction of the openings 10 and 11 prevents the thin teat-cup lining portion 15 opposite the openings from being sucked, together with the skin of the teats, into the chamber 16 at the intervals when the openings are connected by the pulsator to the high vacuum.

As shown in the embodiment of Fig. 5, the annular chamber 18 may be of greater axial length and communicate with a plurality of openings 19, 20, 21 and 22 and diametrically-opposite openings 19', 20', 21' and 22' which decrease in diameter from the end of the cup provided with the rim 23 downwardly. The entrance chamber 18 is constructed in this case as a ring which is open at the inner side and which can be shoved onto the teat-cup 1 from below, so that it can be dismounted easily for cleaning purposes. The upper end of the ring shaped chamber 18 rests against a shoulder 24 on the teat-cup, separated therefrom by a washer 25, and is fastened by a nut 26, a washer 27 being placed between the nut 26 and the bottom end of the chamber 18.

The use of several openings of decreasing diameter further serves to compress the teat-cup lining 2 first at the upper portion of the teat and then gradually at the lower portion, corresponding to the action a good milker effects with his fingers.

The openings 19 to 22 and 19' to 22' in Fig. 5 have the partitioned structure of the openings 10 and 11 of Figs. 1 to 3, the upper openings being provided immediately under the rim 23 of the teat-cup.

It will be obvious that various changes and modifications other than those specifically indicated above may be made in the embodiments illustrated without departing from the scope of the invention as defined in the appended claims. It will further be understood that, insofar as they are not mutually incompatible, the various features and details of construction of the several embodiments shown and described are interchangeable with one another. It is intended, therefore, that all matter contained in the foregoing description and in the drawings shall be interpreted as illustrative only and not as limitative of the invention.

What I claim and desire to secure by Letters Patent is:

1. In a milking machine teat-cup unit an elongated teat-cup lining of flexible and resilient material, a rigid cup wall surrounding said lining and having an upper flange engaged by a resilient flange provided at the upper border of the said lining, the said cup wall having at least one elongated exterior chamber disposed beneath said upper flange and extending on the outside of said cup wall, a substantially elongated opening in said cup wall communicating with said chamber, said opening being provided with closely spaced partitions providing a plurality of spaced smaller openings, and means communicating with said chamber and adapted to be connected to a source of vacuum.

2. A milking machine teat-cup unit as defined in claim 1 having two diametrically opposite openings in said cup wall communicating with said chamber, each of said openings being provided with said closely spaced partitions providing a plurality of spaced smaller openings.

3. A milking machine teat-cup unit as defined in claim 1, wherein said cup wall is provided with a plurality of vertically spaced openings communicating with said chamber.

4. A milking machine teat-cup unit as defined in claim 1, wherein said lining has a greater wall thickness in the lower portion of said cup than in the upper portion of said cup.

References Cited in the file of this patent

UNITED STATES PATENTS

| 948,608 | Hodge et al. | Feb. 8, 1910 |
| 1,105,681 | Moldenhauer | Aug. 4, 1914 |
| 2,334,481 | DaSilveira | Nov. 16, 1943 |
| 2,612,136 | Davis | Sept. 30, 1952 |